US006288201B1

(12) United States Patent
Sasano et al.

(10) Patent No.: US 6,288,201 B1
(45) Date of Patent: Sep. 11, 2001

(54) LAMINATE ADHESIVE

(75) Inventors: Shigetoshi Sasano; Sachio Igarashi, both of Osaka (JP)

(73) Assignee: Takeda Cheical Industries, Ltd., Osaka (JP)

( * ) Notice: Subject to any disclaimer, the term of this patent is extended or adjusted under 35 U.S.C. 154(b) by 0 days.

(21) Appl. No.: 09/626,913

(22) Filed: Jul. 27, 2000

(30) Foreign Application Priority Data

| Aug. 2, 1999 | (JP) | 11-218319 |
| Aug. 2, 1999 | (JP) | 11-218320 |
| Apr. 25, 2000 | (JP) | 12-123781 |
| Apr. 25, 2000 | (JP) | 12-123782 |

(51) Int. Cl.$^7$ .................................................. C08G 18/34
(52) U.S. Cl. ............................................. 528/83; 528/59
(58) Field of Search ........................................ 528/83, 59

(56) References Cited

U.S. PATENT DOCUMENTS

| 4,507,447 | 3/1985 | Yamazaki et al. . |
| 5,202,391 | 4/1993 | Yamazaki et al. . |

FOREIGN PATENT DOCUMENTS

0643734 B1 * 5/1993 (EP) .

* cited by examiner

Primary Examiner—James J. Seidleck
Assistant Examiner—M D. Bagwell
(74) Attorney, Agent, or Firm—Wenderoth, Lind & Ponack, L.L.P.

(57) ABSTRACT

A laminate adhesive that can suppress elusion of a low molecular weight compounds of a composite film into the content, so as to prevent the inherent properties or performances of the content from being spoiled by the low molecular weight compounds. The laminate adhesive comprises a polyisocyanate component and a polyol component, wherein the polyol component includes polyester polyol and/or polyester polyurethane polyol which is produced by reaction of polyester polyol and polyisocyanate, and wherein concentration of cyclic compounds in extracted water which are extracted from a composite film bonded by the laminate adhesive by water of 0.5 mL/cm$^2$ per unit area of the composite film is 0.5 ppb or less in terms of dibutyl phthalate concentration measured by a gas chromatograph-flame ionization detector.

5 Claims, No Drawings

LAMINATE ADHESIVE

BACKGROUND OF THE INVENTION

1. Field of the Invention

This invention relates to a laminate adhesive and, more particularly, to a laminate adhesive which is useful for the manufacture of packaging materials for use in a variety of industrial fields, including packaging materials for food products, beverages, medical products and quasi-drags or packaging materials for electronic components such as hard disks.

2. Description of the Prior Art

Composite film produced by lamination of e.g. plastic film, metal foil of e.g. aluminum, metallized film, and silica evaporated film by use of an adhesive have been widely used as packaging material for use in a variety of industrial fields including packaging materials for food products, beverages, medical products and quasi-drags or packaging materials for electronic components such as hard disks up to the present date.

A two component ester urethane adhesive, using polyisocyanate in combination with polyester polyol or polyester polyurethane polyol, is used most as the laminate adhesive for the manufacture of these packaging materials, because of its excellent adhesion properties.

It is known, on the other hand, that polyester polyol produces by-products of cyclic ester compounds in the manufacture of it, and it has been hitherto believed to be hard to avoid the production of such by-products.

In recent years, there have advanced the studies on the substance to be eluted from packaging material into a content, which suggests the possibility that some low molecular weight compounds may be eluted from the adhesive into the content and the low molecular weight compounds thus eluted may attribute the cause, in part, to spoil the inherent properties of the content, such as the odor and taste of food products and beverages, or the inherent performances of the electronic components, though the cause and effect relationship has not yet been clarified.

It is the object of the present invention to provide a laminate adhesive that can suppress the elusion of a low molecular weight compounds of composite film into the content, so as to prevent the inherent properties or performances of the content from being spoiled by the low molecular weight compounds.

SUMMARY OF THE INVENTION

The present invention is directed to a novel laminate adhesive comprising a polyisocyanate component and a polyol component, wherein the polyol component includes polyester polyol and/or polyester polyurethane polyol which is produced by reaction of polyester polyol and polyisocyanate, and wherein concentration of cyclic compounds in extracted water which are extracted from a composite film bonded by the laminate adhesive by water of 0.5 mL/cm$^2$ per unit area of the composite film is 0.5 ppb or less in terms of dibutyl phthalate concentration measured by a gas chromatograph-flame ionization detector.

The cyclic compounds include cyclic ester compounds and/or cyclic urethane compounds.

According to the laminate adhesive of the present invention, it is preferable that the polyester polyol comprises dimer acid. The polyester polyol may comprise phtalic acid and glycol having 6–7 carbons in its principal chain.

According to the laminate adhesive of the present invention, it is preferable that unreacted glycols in the polyester polyol is 0.1 weight % or less. When the polyester polyurethane polyol is contained in the polyol component, it is preferable that the polyisocyanate used for obtaining the polyester polyurethane polyol comprises dicyclohexylmethane-4,4'-diisocyanate and/or diphenylmethane-4,4'-diisocyanate.

DESCRIPTION OF THE PREFERRED EMBODIMENTS

The laminate adhesive of the present invention comprises a polyisocyanate component and a polyol component.

Polyisocyanates commonly used in the manufacture of polyurethane may be used as the polyisocyanate components of the invention. Examples of the polyisocyanate components include polyisocyanate monomers and derivatives thereof.

Examples of the polyisocyanate monomers include aliphatic diisocyanate such as hexamethylene diisocyanate, alicyclic diisocyanate such as 3-isocyanatomethyl-3,5,5-trimethylcyclohexyl isocyanate, dicyclohexylmethane-4,4'-diisocyanate, 1,3- or 1-4-bis(isocyanatomethyl) cyclohexane or mixtures thereof, aralkyl diisocyanate such as 1,3- or 1-4-xylylene diisocyanate or mixtures thereof, 1,3- or 1-4-bis(1-isocyanato-1-methylethyl)benzene or mixtures thereof, and aromatic diisocyanate such as 2,4- or 2,6-tolylenediisocyanate or mixtures thereof, diphenylmethane-4,4'-disocyanate.

Examples of the derivatives of the polyisocyanate monomers include dimers or trimers of polyisocyanate monomers, biurets, allophanates and oxadiazinetriones obtained by reaction of the polyisocyanate monomers with water, polyhydric alcohol, carbon dioxide gas and so on. Two or more of these monomers and derivatives thereof may be used in combination.

Polyols commonly used in the manufacture of polyurethane may be used as the polyol components of the invention. Preferable examples of the polyol components of the invention include polyester polyol and polyester polyurethane polyol.

The polyester polyol can be obtained by a known esterification reaction, i.e., by a condensation reaction between polybasic acid and polyhydric alcohol or by an ester interexchange reaction between alkyl ester of polybasic acid and polyhydric alcohol.

Preferable examples of the polybasic acids and alkyl esters thereof include dimer acid, phthalic acid, such as orthophthalic acid, isophthalic acid and terephthalic acid, or dialkyl esters thereof or mixtures thereof. The dimer acid comprises, in general, a dimer of unsaturated aliphatic acid having 18 carbons as its major component which is available as industrial material and additionally includes a monomer acid and a trimer acid.

Preferably, the polyhydric alcohols include glycol, such as ethylene glycol, diethylene glycol, propylene glycol, 1,4-butanediol, neopentyl glycol, 1,6-hexandiol, 1,7-heptanediol, 1,9-nonanediol, cyclohexanedimethanol, 3-methyl-1,5-pentanediol, 3,3'-dimethylolheptane, or 2-methyl-1,8-octanediol, triol such as glycerine or trimethylolpropane, dimethylol alkane acid such as dimethylol propionic acid or dimethylol butanoic acid, or mixtures thereof.

Of these polybasic acids and polyhydric alcohols, dimer acid and isophthalic acid are particularly preferable as the polybasic acid, and glycol, especially glycol including no ether linkage in the principal chain and having 6–7 carbons in the principal chain and 1,6-hexandiol, in particular, in the case of isophthalic acid being used, are preferable as the polyhydric alcohol. It is to be noted that the principal chain of glycol means a molecular chain sandwiched between two hydroxyl groups and the number of carbons of the principal chain indicate the number of carbons in the molecular chain.

The following two can be cited as the reason why dimer acid and isophthalic acid are preferable as the polybasic acid, and glycol and 1,6-hexandiol are preferable as the polyhydric alcohol. One is that the cyclic ester compound of the dimer acid and the glycol produced by the reaction of dimer acid and glycol is not eluted through the film. Another is that the cyclic ester compound of two molecules of the isophthalic acid and two molecules of the 1,6-hexandiol produced by the reaction of isophthalic acid and 1,6-hexandiol is eluted through the films with difficulty.

For example, when the isophthalic acid and glycol having 5 or less carbons in the principal chain are allowed to react with each other, there may be a case where a cyclic ester compound of two molecules of the isophthalic acid and two molecules of the glycol is produced and the cyclic ester compound is eluted through the film. On the other hand, when isophthalic acid and glycol having 8 or more carbons in the principal chain are allowed to react with each other, there may be a case where a cyclic ester compound of one molecule of the isophthalic acid and one molecule of the glycol is produced and the cyclic ester compound may be eluted through the film. In view of this, the combination of dimer acid and glycol, the combination of isophthalic acid and 1,6-hexandiol, and the combination of dimer acid, isophthalic acid and 1,6-hexandiol are cited as most preferable examples.

Known conditions for the esterification reaction for producing the polyester polyol may be used in the invention. The polyester polyol obtained has the number average molecular weight of about 500 to about 10,000, or preferably about 1,000 to about 5,000.

Also, unreacted glycols in the polyester polyol obtained is preferably 0.1 weight % or less. With a more than 0.1 weight % unreacted glycols, when the polyester polyol is allowed to react with the polyisocyanate component, or when the polyester polyol and the polyisocyanate monomer are allowed to react with each other to obtain the polyester polyurethane polyol, the polyisocyanate monomers may react with the unreacted glycols, depending on the groups of polyisocyanate monomer, so that they may produce cyclic urethane compounds that may be eluted through the film. The content of the unreacted glycols in the polyester polyol can be measured by the gas chromatography (flame ionization detector), for example. The unreacted glycols in the polyester polyol can be reduced to 0.1 weight % or less by a known removal operation, such as a removal operation that after the esterification reaction, the unreacted glycols are removed under a reduced pressure.

The polyester polyurethane polyol can be obtained by allowing the polyester polyol and the polyisocyanate monomer to react with each other under known conditions for reaction for obtaining urethanes. While a preferable polyisocyanate monomer may be suitably selected of the polyisocyanate monomers to be allowed to react with the polyester polyol, dicyclohexylmethane-4,4'-diisocyanate and/or diphenylmethane-4,4'-diisocyanate are preferably used. It is hard for the dicyclohexylmethane-4,4'-diisocyanate and/or the diphenylmethane-4,4'-diisocyanate to produce a cyclic compound with glycol, so there is no need to consider the content of unreacted glycols in the polyester polyol.

Preferably, the ratio for polyester polyol and polyisocyanate monomer to be allowed to react with each other is less than 1, preferably 0.5–0.95, in the equivalent ratio (NCO/OH) of an isocyanate group of polyisocyanate monomer to a hydroxyl group of polyester polyol. The polyester polyurethane polyol thus obtained has preferably the number average molecular weight of about 1,000 to about 100,000, further preferably about 5,000 to about 20,000.

It should be noted that the polyester polyurethane polyol may alternatively be obtained by allowing the polyhydric alcohol to react with the polyisocyanate monomer together with the polyester polyol under the above-mentioned conditions for reaction for obtaining urethans. Specifically, the polyester polyol, polyhydric alcohol and polyisocyanate monomer may be allowed to react with each other in such a ratio that the equivalent ratio (NCO/OH) of the isocyanate group of polyisocyanate monomer to the hydroxyl group of polyester polyol and polyhydric alcohol can be less than 1 or preferably 0.5–0.95.

The laminate adhesive of the present invention can be obtained by formulating the polyisocyanate component and the polyol component as mentioned above. The ratio for the polyisocyanate component and the polyol component to be blended is in the range of between not less than 0.4 and not more than 10.0, preferably between not less than 0.5 and not more than 5.0, in the equivalent ratio (NCO/OH) of an isocyanate group of the polyisocyanate component to a hydroxyl group of the polyol component. Examples of the preferable combinations of the polyisocyanate component and the polyol component include the combination of polyisocyanate monomer derivative and polyester polyol, the combination of polyisocyanate monomer derivative and polyester polyurethane polyol, and the combination of polyisocyanate monomer derivative and polyester polyol and polyester polyurethane polyol.

Further, additives intended for the improvement of adhesion properties, such as a silane coupling agent, an oxy acid of phosphorous or derivative thereof, and a known catalyst for adjusting the curing reaction may be blended in the laminate adhesion of the present invention within the range that the performance of the laminate adhesion of the present invention is not inhibited.

The laminate adhesive of the present invention thus produced is mainly used as the adhesive for use in the manufacture of a composite film by lamination of films. The laminating of the composite film can be performed by the following two methods, for example. One is that the polyisocyanate component and the polyol component are diluted with organic solvent and blended, for preparation of the laminate adhesive of the present invention and, thereafter, the adhesive thus prepared is applied onto surfaces of the respective films by use of a solvent type laminator. After the solvent is vaporized, the surfaces of the films are adhesive bonded and then cured under room temperature or warmed temperature for the curing. Another is that where the blending viscosity of polyisocyanate component and polyol component is about 100 to about 10,000 mPa·s, preferably about 100 to about 5,000 mPa·s, in the temperature range of from room temperature to 100° C., e.g. polyisocyanate compound and polyol component are blended as they are, for preparation of the laminate adhesive of the present invention and, thereafter, the adhesive thus prepared is applied onto surfaces of the respective films by use of a solvent-free type laminator to adhesive bond the surfaces of the films. Then, the surfaces are cured under room temperature or warmed temperature for the curing of the adhesive. The spread of the adhesive of the solvent type is usually about 2.0 to about 5.0 g/m² after evaporation of the solvent, and the spread of the adhesive of the solvent-free type is preferably about 1.0 to about 3.0 g/m².

Examples of the films to be laminated include plastic films of e.g. polyethylene terephthalate, nylon, polyethylene, polypropylene, polyvinyl chloride, metal foils of e.g. aluminum, metallized films, silica evaporated films, and metallic films of e.g. stainless steel, iron, copper and lead. Preferably, the plastic film, for example, have the thickness of 5–200 μm.

The laminate adhesive of the present invention is so made that the concentration of the cyclic compounds in extracted water which are extracted from the thus laminated composite film by water of 0.5 mL/cm² per unit area of the composite film can be 0.5 ppb or less in terms of dibutyl phthalate concentration measured by the gas chromatograph-flame ionization detector. With the 0.5 ppb or less concentration, the elution of the cyclic compounds of the composite film into the content originating from the adhesive is extremely reduced, as compared with the conventional ester based urethane adhesives. The cyclic compounds include the above-noted cyclic ester compound and the cyclic urethane compound.

The concentration of the cyclic ester compound and the cyclic urethane compound can be determined by the following method, for example. A bag is made from the composite film produced by lamination of films as mentioned above, and the bag is filled with ion-exchange distilled water as the content by the amount of 0.5 mL/cm² per unit area of the composite film. After the bag is sterilized by heated water under pressure, the contained water is extracted by any selected known method for recovering substantially all cyclic ester compounds and cyclic urethane compounds, such as a liquid-solid extraction or a liquid-liquid extraction. Then, samples are drawn from the extracts and are measured by the gas chromatography (flame ionization detector).

The quantity can be determined as a value to be converted to dibutyl phthalate concentration measured by the flame ionization detector of the gas chromatograph, using dibutyl phthalate as standard substance. For example, if a detection limit of the concentration of the cyclic ester compounds and cyclic urethane compounds in the extracted water is 0.5 ppb in the terms of dibutyl phthalate concentration, then the concentration of the cyclic compounds of 0.5 ppb or less in terms of dibutyl phthalate concentration can be determined depending upon whether the cyclic ester compounds and cyclic urethane compounds are detected or not.

According to the laminate adhesive of the present invention, since the concentration of the cyclic ester compounds and the cyclic urethane compounds thus measured is 0.5 ppb or less, the elution of the cyclic compounds of the composite film into the content originating from the adhesive is extremely reduced, as compared with the conventional ester based urethane adhesives. This can provide the result that when a food product or beverage is packed in the film, the inherent properties, such as the odor and taste, of the food product or beverage can be prevented from being spoiled. Also, when an electronic component such as a hard disc which is subjected to loss by even an extremely small amount of inclusion is packed in the film, the inherent performances of the electronic component can be prevented from being spoiled. Thus, the laminate adhesive of the present invention can be suitably used as the laminate adhesive for the manufacture of packaging materials for a variety of industrial products including those products.

EXAMPLES

While the present invention will be described in further detail with reference to the following examples, the present invention is not limited to those examples. The terms of "parts" and "%" presented in the examples and the comparative examples are all on a weight basis, unless otherwise specified therein.

Producing Example 1

Produce of Polyester Polyol a 831.2 g of dimer acid and 159.8 g of ethylene glycol were added, respectively, for esterification reaction at 180–220° C. in a stream of nitrogen. After a prescribed amount of water was distilled, polyester polyol a having a number average molecular weight of about 1,000 was obtained. It was found that the unreacted glycols in the polyester polyol a was 1.5 weight %. The content of the unreacted glycols was determined by the gas chromatography (flame ionization detector).

Producing Example 2

Produce of Polyester Polyol b 590.0 g of isophthalic acid and 543.3 g of 1,6-hexandiol were added, respectively, for esterification reaction at 180–220° C. in a stream of nitrogen. After a prescribed amount of water was distilled, the unreacted glycols was removed under the reduced pressure of 13.3 Pa, to thereby produce polyester polyol b having a number average molecular weight of about 1,500. It was found that the unreacted glycols in the polyester polyol b was 0.08 weight %.

Producing Example 3

Produce of Polyester Polyol c 590.0 g of isophthalic acid and 543.3 g of 1,6-hexandiol were added, respectively, for esterification reaction at 180–220° C. in a stream of nitrogen. After a prescribed amount of water was distilled, polyester polyol c having a number average molecular weight of about 1,000 was obtained. It was found that the unreacted glycols in the polyester polyol c was 1.7 weight %.

Producing Example 4

Produce of Polyester Polyol d 371.5 g of isophthalic acid, 413.2 g of 1,6-hexandiol and 0.1 g of zinc acetate were added, respectively, for esterification reaction at 180–220° C. in a stream of nitrogen. After a prescribed amount of water was distilled, 320.0 g of dimer acid was added, for esterification reaction at 180–220° C., to thereby produce polyester polyol d having a number average molecular weight of about 1,500. It was found that the unreacted glycols in the polyester polyol d was 1.0 weight %.

Producing Example 5

Produce of Polyester Polyol e 176.4 g of isophthalic acid and 221.7 g of 1,7-heptanediol were added, respectively, for esterification reaction at 180–220° C. in a stream of nitrogen. After a prescribed amount of water was distilled, 151.9 g of dimer acid was added, for esterification reaction at 180–220° C., to thereby produce polyester polyol e having a number average molecular weight of about 1,500. It was found that the unreacted glycols in the polyester polyol e was 1.0 weight %.

Producing Example 6

Produce of Polyester Polyol f 600.4 g of dimethylisophthalate, 169.2 g of 1,6-hexandiol, 458.3 g of mixture of 2-methyl-1,8-octanediol (85%) and 1,9-nonanediol (15%) and 0.1 g of titanium tetraisopropoxide were added, respectively, for ester interexchange reaction at 180–220° C. in a stream of nitrogen. After a prescribed amount of methanol was distilled, polyester polyol f having a number average molecular weight of about 1,000 was obtained. It was found that the unreacted glycols in the polyester polyol f were 0.5 weight % of 1,6-hexandiol and 1.0 weight % in total of 2-methyl-1,8-octanediol and 1,9-nonanediol.

Producing Example 7

Produce of Polyester Polyol g 314.0 g of isophthalic acid, 138.6 g of 1,6-hexandiol, 277.3 g of 3-methyl-1,5-pentanediol and 0.1 g of zinc acetate were added, respectively, for esterification reaction at 180–220° C. in a stream of nitrogen. After a prescribed amount of water was distilled, 360.7 g of dimer acid was added, for esterification reaction at 180–220° C., to thereby produce polyester polyol g having a number average molecular weight of about 2,000. It was found that the unreacted glycols in the polyester polyol g were 0.4 weight % of 1,6-hexandiol and 0.5 weight % of 3-methyl-1,5-pentanediol.

Producing Example 8

Produce of Polyester Polyol h 529.4 g of isophthalic acid, 128.8 g of ethylene glycol and 302.4 g of neopentyl glycol were added, respectively, for esterification reaction at 180–220° C. in a stream of nitrogen. After a prescribed amount of water was distilled, 214.8 g of sebacic acid was added, for esterification reaction at 180–220C., to thereby produce polyester polyol h having a number average molecular weight of about 3,000. The total amount of the product was dissolved in 428.6 g of ethyl acetate to produce a solution of 70% solid content. It was found that the unreacted glycols in the polyester polyol h were 0.2 weight % of ethylene glycol and 0.3 weight % of neopentyl glycol.

Producing Example 9

Produce of Polyester Polyurethane Polyol A 400 g of polyester polyol a and 83.8 g of dicyclohexylmethane-4,4'-diisocyanate were added, respectively, for reaction at 100–110° C. under a nitrogen atmosphere. After the reaction, 483.8 g of ethyl acetate was added to produce polyester polyurethane polyol A in the form of a solution of 50% solid content.

Producing Example 10

Produce of Polyester Polyurethane Polyol B

Polyester polyurethane polyol B of 50% solid content was produced from 400 g of polyester polyol b, 47.4 g of 3-isocyanatomethyl-3,5,5-trimethylcyclohexylisocyanate and 447.4 g of ethyl acetate in the same manner as in Producing Example 9.

Producing Example 11

Produce of Polyester Polyurethane Polyol C

Polyester polyurethane polyol C of 50% solid content was produced from 400 g of polyester polyol c, 71.1 g of 3-isocyanatomethyl-3,5, 5-trimethylcyclohexylisocyanate and 471.1 g of ethyl acetate in the same manner as in Producing Example 9.

Producing Example 12

Produce of Polyester Polyurethane Polyol D

Polyester polyurethane polyol D of 50% solid content was produced from 400 g of polyester polyol c, 83.8 g of dicyclohexylmethane-4,4'-diisocyanate and 483.8 g of ethyl acetate in the same manner as in Producing Example 9.

Producing Example 13

Produce of Polyester Polyurethane Polyol E

Polyester polyurethane polyol E of 50% solid content was produced from 350 g of polyester polyol d, 48.9 g of dicyclohexylmethane-4,4'-diisocyanate and 398.9 g of ethyl acetate in the same manner as in Producing Example 9.

Producing Example 14

Produce of Polyester Polyurethane polyol F

Polyester polyurethane polyol F of 50% solid content was produced from 200 g of polyester polyol a, 200 g of polyester polyol b, 69.6 g of dicyclohexylmethane-4,4'-diisocyanate and 469.6 g of ethyl acetate in the same manner as in Producing Example 9.

Producing Example 15

Produce of Polyester Polyurethane Polyol G

Polyester polyurethane polyol G of 50% solid content was produced from 400 g of polyester polyol e, 55.9 g of dicyclohexylmethane-4,4'-diisocyanate and 455.9 g of ethyl acetate in the same manner as in Producing Example 9.

Producing Example 16

Produce of Polyester Polyurethane Polyol H

Polyester polyurethane polyol H of 50% solid content was produced from 400 g of polyester polyol f, 71.1 g of 3-isocyanatomethyl-3,5,5-trimethylcyclohexylisocyanate and 471.1 g of ethyl acetate in the same manner as in Producing Example 9.

Producing Example 17

Produce of Polyester Polyurethane Polyol I

Polyester polyurethane polyol I of 50% solid content was produced from 350 g of polyester polyol g, 31.1 g of 3-isocyanatomethyl-3,5,5-trimethylcyclohexylisocyanate and 381.1 g of ethyl acetate in the same manner as in Producing Example 9.

Producing Example 18

Produce of Polyester Polyurethane Polyol J 647.3 g of polyester polyol h and 55.2 g of dicyclohexylmethane-4,4'-diisocyanate were added, respectively, for reaction at 75° C. under a nitrogen atmosphere. After the reaction, 314.1 g of ethyl acetate was added to produce polyester polyurethane polyol J in the form of a solution of 50% solid content.

Producing Example 19

Produce of Polyester Polyurethane Polyol K 350 g of polyester polyol d, 45.8 g of diphenylmethane-4,4'-diisocyanate and 150 g of ethyl acetate were added, respectively, for reaction at 75° C. under a nitrogen atmosphere. After the reaction, 245.8 g of ethyl acetate was added to produce polyester polyurethane polyol K in the form of a solution of 50% solid content.

Producing Example 20

Produce of Polyester Polyurethane Polyol L

Polyester polyurethane polyol L of 50% solid content was produced from 320 g of polyester polyol a, 2.2 g of dimethylol propionic acid, 71.8 g of dicyclohexylmethane-4,4'-diisocyanate and 394.0 g of ethyl acetate in the same manner as in Producing Example 9.

Producing Example 21

Produce of Polyisocyanate A 70 g of 3-isocyanatomethyl-3,5,5-trimethylcyclohexylisocyanate trimer (VESTANATE T 1890/100 available from Huls Corporation) of an isocyanate group content of 17.3% was dissolved in 30 g of ethyl acetate to produce a solution of 70% solid content. Hereinafter this solution is referred to as "polyisocyanate A".

Producing Example 22

Produce of Polyisocyanate B 188.2 g of xylylene diisocyanate was heated to 90° C. and 44.7 g of trimethylol propane was added thereto little by little for 2 hours reaction. Subsequently, 77.6 g of ethyl acetate was added and stirred uniformly, to thereby produce a solution of a 75% solid content, a 13.5% isocyanate group content and a 1,800 mPa·s viscosity at 25° C. Hereinafter this solution is referred to as "polyisocyanate B".

Producing Example 23

Produce of Polyisocyanate C

A mixed solution of 100 g of hexamethylene diusocyanate and 00.1 g of trimethyl benzylammonium hydroxide was subjected to trimerization reaction at 60° C. Fog 1 hour. Subsequently, unreacted monomers were removed at 120° C. at 13.3 Pa to produce 35 g of a hexamethylene diisocyanate trimer. It was found that the trimer thus produced was of a 100% solid content, a 0.1% unreacted monomer content, a 21% isocyanate group content and a 2,000 mPa·s viscosity at 25° C. Hereinafter this is referred to as "polyisocyanate C".

Preparation of and Evaluation of Examples and Comparative Examples

The polyester polyol d, the polyester polyurethane polyols A–L and the polyisocyanates A–C thus obtained were blended as cited in TABLE 1 to prepare the laminate adhesives of Examples 1–11 and those of Comparative Examples 1–4. Subsequently, the composite films were produced in a method as will be mentioned later using the laminate adhesives of the respective Examples and Comparative Examples. Thereafter, the elution tests on the respective composite films were conducted. The results are shown in TABLE 2.

Production of Composite Film

A three-layered composite film of a polyethylene terephthalate film (12 μm in thickness)/an aluminum foil (9 μm in thickness)/an unextended polypropylene film (70 μm in thickness, as subjected to corona discharge treatment) was produced by the following method.

The laminate adhesives of Examples and Comparative Examples cited in TABLE 1 were applied onto an aluminum surface of the two-layered composite film made by the polyethylene terephthalate film and the aluminum foil being adhesive bonded together in advance. The spread of the adhesive was 2.5 g/m² by weight of a solid content of the adhesive per unit area by use of a dry laminator or a solvent-free type laminator. Then, the surface applied with the adhesive was bonded with the unexrtended polypropylene film. Thereafter, the bonded film was cured at 50° C. for 3 days, for the curing of the adhesives.

Elution Tests

A bag was made from each of the composite films thus produced and then was filled with ion-exchange distilled water as the content by the amount of 0.5 mL/cm² per unit area of the interior surface of the bag. After the bag was sterilized by heated water under the pressure of $19.6 \times 10^4$ Pa at 120° C. for 30 minutes, the contained water was extracted in the solid phase modified with an octadecyl group. Then, samples were drawn from the extracts which were dissolved in methanol of one hundredth of the quantity of original water. The samples were measured by the gas chromatography (flame ionization detector) and observed on the presence of the cyclic ester compounds and cyclic urethane compounds. When the eluting substance was observed, the structure of the eluting substance was analyzed by use of a gas chromatograph mass spectrograph. The detection limit of the gas chromatograph (flame ionization detector) for the methanol solution of dibutyl phthalate was 50 ppb which was equivalent to 0.5 ppb in terms of the concentration of the cyclic ester compounds and cyclic urethane compounds in the extracted water in the elution tests.

While the illustrative embodiments of the present invention are provided in the above description, such is for illustrative purpose only and it is not to be construed restrictively. Modification and variation of the present invention that will be obvious to those skilled in the art is to be covered in the following claims.

TABLE 1

| | Polyol component | | | | | | | | | | | | Polyisocyanate component | | |
|---|---|---|---|---|---|---|---|---|---|---|---|---|---|---|---|
| | Polyester polyol | Polyester polyurethane polyol | | | | | | | | | | | | | |
| Laminate adhesive | d | A | B | C | D | E | F | G | H | I | J | K | L | A | B | C |
| Example 1 | 100 | | | | | | | | | | | | | 12 | | |
| Example 2 | 100 | | | | | | | | | | | | | | 10 | |

TABLE 1-continued

| | Polyol component | | | | | | | | | | | | | | Polyisocyanate component | | |
|---|---|---|---|---|---|---|---|---|---|---|---|---|---|---|---|---|---|
| | Polyester polyol | Polyester polyurethane polyol | | | | | | | | | | | | | | | |
| Laminate adhesive | d | A | B | C | D | E | F | G | H | I | J | K | L | A | B | C |
| Example 3 | | 100 | | | | | | | | | | | | | | 6.5 |
| Example 4 | | | 100 | | | | | | | | | | | 12 | | |
| Example 5 | | | | 100 | | | | | | | | | | 12 | | |
| Example 6 | | | | | 100 | | | | | | | | | 12 | | |
| Example 7 | | | | | | | 100 | | | | | | | 12 | | |
| Example 8 | 100 | | | | | | | | | | | | | | 20 | |
| Example 9 | | | | | | | | | 100 | | | | | 12 | | |
| Example 10 | | | | | | | | | | | | 100 | | | | 6.5 |
| Example 11 | | | | | | | | | | | | | 100 | 12 | | |
| Comparative Example 1 | | | | | | | | | 100 | | | | | 12 | | |
| Comparative Example 2 | | | | | | | | | | | 100 | | | 12 | | |
| Comparative Example 3 | | | | | | | | | | | | 100 | | 12 | | |
| Comparative Example 4 | | | | 100 | | | | | | | | | | 12 | | |

TABLE 2

| Adhesive Composition No. | Presence of cyclic ester compound eluted | Structure of cyclic ester compound observed | Presence of cyclic urethane compound eluted | Structure of cyclic urethane compound observed |
|---|---|---|---|---|
| Examples | | | | |
| 1 | Without | | Without | |
| 2 | Without | | Without | |
| 3 | Without | | Without | |
| 4 | Without | | Without | |
| 5 | Without | | Without | |
| 6 | Without | | Without | |
| 7 | Without | | Without | |
| 8 | Without | | Without | |
| 9 | Without | | Without | |
| 10 | Without | | Without | |
| 11 | Without | | Without | |
| Comparative Examples | | | | |
| 1 | With | IPA/MOD, IPA/ND | With | IPDI/MOD, IPDI/ND, IPDI/HD |
| 2 | With | IPA/IPA/MPD/MPD, IPA/IPA/MPD/HD | With | IPDI/HD, IPDI/MPD |
| 3 | With | SbA/EG, SbA/NPG, SbA/IPA/EG/EG, SbA/IPA/EG/NPG, SbA/IPA/NPG/NPG, IPA/IPA/EG/EG, IPA/IPA/EG/NPG, IPA/IPA/NPG/NPG | Without | |
| 4 | Without | | With | IPDI/HD |

Abbreviations in TABLE are as follows.
IPA: Isophthalic acid, SbA: Sebacic acid
MOD: 2-methyl-1,8-octanediol, ND: 1,9-nonanediol, HD: 1,6-hexandiol
MPD: 3-methyl-1,5-pentanediol, EG: ethylene glycol, NPG: neopentyl glycol
IPDI: 3-isocyanatomethyl-3,5,5-trimethylcyclohexyl isocyanate

What is claimed is:

1. A laminate adhesive comprising a polyisocyanate component and a polyol component;
   wherein said polyol component includes a polyester polyol and/or a polyester polyurethane polyol which is produced by reaction of a polyester polyol and a polyisocyanate;
   wherein said polyester polyol is produced by a reaction including, as the only acid reactant, at least one polybasic acid selected from the group consisting of dimer acid, phthalic acid and dialkyl esters thereof; and
   wherein when cyclic compounds are extracted with water from a composite film bonded by said laminate adhesive in an amount of 0.5 mL/cm$^2$ per unit area of said composite film, the concentration of cyclic compounds in the extracted water is 0.5 ppb or less in terms of dibutyl phthalate concentration measured by a gas chromatograph-flame ionization detector.

2. The laminate adhesive according to claim 1, wherein said cyclic compounds are cyclic ester compounds and/or cyclic urethane compounds.

3. The laminate adhesive according to claim 1, wherein unreacted glycol in said polyester polyol is 0.1 weight % or less.

4. The laminate adhesive according to claim 1, wherein said polyisocyanate used for obtaining said polyester polyurethane polyol comprises dicyclohexylmethane-4,4'-diisocyanate and/or diphenylmethane-4,4'- diisocyanate.

5. The laminate adhesive according to claim 1, wherein said polyester polyol consists essentially of a combination of dimer acid and glycol, a combination of phthalic acid and glycol including no ether linkage in its principal chain and having 6–7 carbons in the principal chain, a combination of dimer acid, phthalic acid and glycol including no ether linkage in its principal chain and having 6–7 carbons in the principal chain, or mixtures thereof.

* * * * *

UNITED STATES PATENT AND TRADEMARK OFFICE
CERTIFICATE OF CORRECTION

PATENT NO. : 6,288,201 B1  
DATED : September 11, 2001  
INVENTOR(S) : Shigetoshi Sasano et al.

Page 1 of 1

It is certified that error appears in the above-identified patent and that said Letters Patent is hereby corrected as shown below:

<u>Title page,</u>  
Item [73], the Assignee name should read -- Mitsui Takeda Chemicals, Inc., Tokyo, Japan --

Signed and Sealed this

Ninth Day of April, 2002

Attest:

Attesting Officer

JAMES E. ROGAN  
*Director of the United States Patent and Trademark Office*